United States Patent
Naito et al.

(10) Patent No.: US 9,789,538 B2
(45) Date of Patent: Oct. 17, 2017

(54) METHOD FOR PRODUCING ULTRAFINE TUNGSTEN POWDER

(71) Applicant: SHOWA DENKO K.K., Tokyo (JP)

(72) Inventors: Kazumi Naito, Tokyo (JP); Shoji Yabe, Tokyo (JP)

(73) Assignee: SHOW A DENKO K.K., Tokyo (JP)

(*) Notice: Subject to any disclaimer, the term of this patent is extended or adjusted under 35 U.S.C. 154(b) by 318 days.

(21) Appl. No.: 14/652,163

(22) PCT Filed: Sep. 20, 2013

(86) PCT No.: PCT/JP2013/075496
§ 371 (c)(1),
(2) Date: Jun. 15, 2015

(87) PCT Pub. No.: WO2014/097698
PCT Pub. Date: Jun. 26, 2014

(65) Prior Publication Data
US 2015/0321254 A1    Nov. 12, 2015

(30) Foreign Application Priority Data
Dec. 17, 2012 (JP) ................... 2012-274532

(51) Int. Cl.
*B22F 9/16* (2006.01)
*C23C 8/10* (2006.01)
(Continued)

(52) U.S. Cl.
CPC ............... *B22F 1/02* (2013.01); *B22F 9/04* (2013.01); *C22C 27/04* (2013.01); *C23C 8/02* (2013.01);
(Continued)

(58) Field of Classification Search
CPC .... B22F 1/02; B22F 2304/05; B22F 2204/03; B22F 2204/05; C23C 8/02; C23C 8/42; C25D 5/34; C25D 7/006
See application file for complete search history.

(56) References Cited

U.S. PATENT DOCUMENTS 7,154,743 B2    12/2006    Takatani et al.
2007/0224096 A1    9/2007    Albrecht et al.

FOREIGN PATENT DOCUMENTS

CN    101 983 804 A    7/2012
EP    0 282 946 A1    9/1988
(Continued)

OTHER PUBLICATIONS

Communication dated Jul. 14, 2016, from the European Patent Office in counterpart European Application No. 13865497.5.
(Continued)

*Primary Examiner* — Lois Zheng
(74) *Attorney, Agent, or Firm* — Sughrue Mion, PLLC

(57) ABSTRACT

A method for finely powdering tungsten powder, which includes: a process for classifying a material tungsten powder into a fine powder having a relatively small average particle diameter and a coarse powder having a relatively large average particle diameter; an oxidation process for forming an oxide film on the particle surface of the coarse powder; and an alkali treatment process for removing the oxide film formed in the oxidation process and a natural oxide film formed on the fine powder with an alkali aqueous solution. Also disclosed is a method for producing ultrafine tungsten powder, which includes obtaining tungsten powder having an average particle diameter of 0.04 to 0.4 μm and a BET specific surface area of 5 to 15 m²/g by the above method for finely powdering.

15 Claims, 1 Drawing Sheet

(51) Int. Cl.
*B22F 1/02* (2006.01)
*C23C 8/42* (2006.01)
*C23C 8/02* (2006.01)
*C25D 5/34* (2006.01)
*C25D 7/00* (2006.01)
*C22C 27/04* (2006.01)
*B22F 9/04* (2006.01)
*H01G 9/052* (2006.01)

(52) U.S. Cl.
CPC .................. *C23C 8/42* (2013.01); *C25D 5/34* (2013.01); *C25D 7/006* (2013.01); *H01G 9/0525* (2013.01); *B22F 2998/10* (2013.01); *B22F 2999/00* (2013.01); *H01G 9/052* (2013.01)

(56) References Cited

FOREIGN PATENT DOCUMENTS

| | | |
|---|---|---|
| EP | 2 055 412 A2 | 5/2009 |
| EP | 2 484 463 A1 | 8/2012 |
| JP | 52-11752 A | 1/1977 |
| JP | 59-59808 A | 4/1984 |
| JP | 2003-272959 A | 9/2003 |
| JP | 2004-349658 A | 12/2004 |
| JP | 2007-211333 A | 8/2007 |
| WO | 2004/055843 A1 | 7/2004 |
| WO | 2012/086272 A1 | 6/2012 |
| WO | 2013/073253 A1 | 5/2013 |
| WO | 2013/080617 A1 | 6/2013 |

OTHER PUBLICATIONS

International Search Report for PCT/JP2013/075496 dated Dec. 10, 2013.

[Fig. 1]
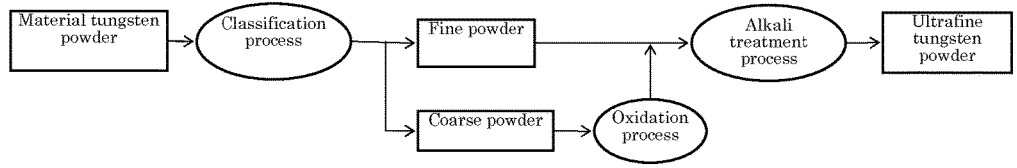
[Fig. 2]
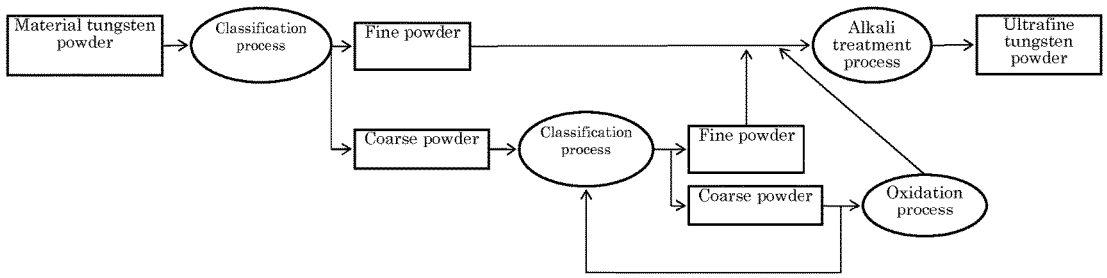
[Fig. 3]
(A)
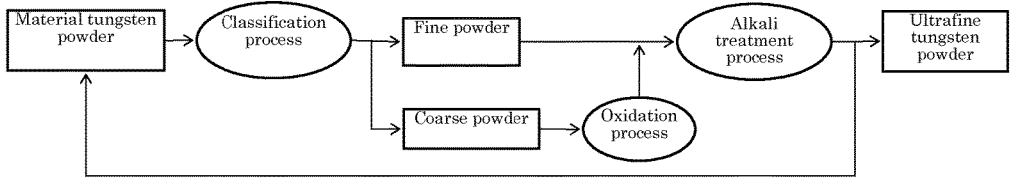
(B)
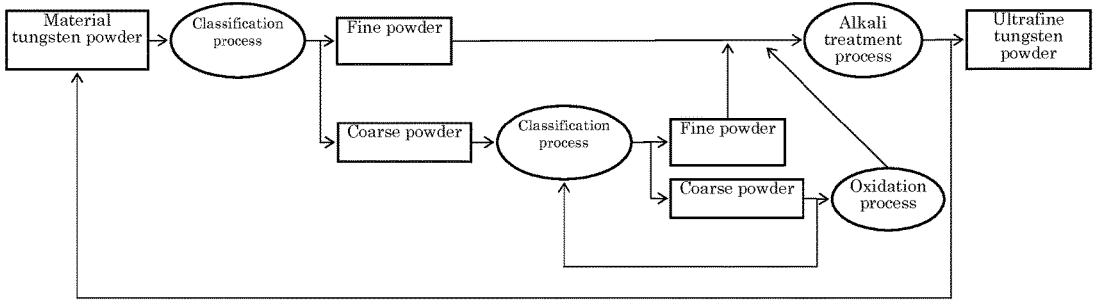

METHOD FOR PRODUCING ULTRAFINE TUNGSTEN POWDER

CROSS REFERENCE TO RELATED APPLICATIONS

This application is a National Stage of International Application No. PCT/JP2013/075496 filed Sep. 20, 2013, claiming priority based on Japanese Patent Application No. 2012-274532 filed Dec. 17, 2012, the contents of all of which are incorporated herein by reference in their entirety.

TECHNICAL FIELD

The present invention relates to a method for producing ultrafine tungsten powder. Specifically, the present invention relates to a method for obtaining a high yield of a tungsten powder having a smaller particle size and a larger BET specific surface area which is useful for use in an electrolytic capacitor; and a method for producing ultrafine tungsten powder using the above method.

BACKGROUND ART

With the progress of small-size, high-speed and light-weight electronic devices such as cellular phones and personal computers, the capacitor used for these electronic devices is demanded to be smaller in size and lighter in weight and to have a larger capacitance and a lower ESR (Equivalent Series Resistance).

As an example of such a capacitor, the electrolytic capacitor has been proposed, which capacitor is produced by anodically oxidizing an anode body for capacitors comprising a sintered body made of a valve-acting metal powder which can be anodized such as tantalum to form a dielectric layer made of the oxide of the metal on the surface of the anode body.

The electrolytic capacitor using tungsten as a valve-acting metal and employing the sintered body of the tungsten powder as an anode body can attain a larger capacitance compared to the electrolytic capacitor employing an anode body of the same volume which uses tantalum powder of the same particle diameter and is treated with the same formation voltage. However, the electrolytic capacitor having the sintered body of the tungsten powder has been unpracticed as an electrolytic capacitor due to the large leakage current (LC). In order to solve this issue, a capacitor using the alloy of tungsten and other metals has been studied and has achieved some improvement in the leakage current, but it was not enough (JP-A-2004-349658; Patent Document 1).

Patent Document 2 (JP-A-2003-272959) discloses a capacitor using an electrode of a tungsten foil having formed thereon a dielectric layer selected from $WO_3$, $W_2N$ and $WN_2$, but the capacitor is not to solve the above-mentioned leakage current problem.

Also, Patent Document 3 (WO 2004/055843 publication (U.S. Pat. No. 7,154,743 B2)) discloses an electrolytic capacitor using an anode body selected from tantalum, niobium, titanium and tungsten, but it does not describe a specific example using tungsten in the specification.

Patent Document 4 (WO 2012/086272 publication) discloses an electrolytic capacitor using as an anode a sintered body of tungsten powder containing silicon, which capacitor can solve the leakage current (LC) problem. The document discloses a method of incorporating silicon in a tungsten powder, using a commercially-available tungsten powder or a tungsten powder reduced with hydrogen and the like as a material tungsten powder.

In an anode body for an electrolytic capacitor which is obtained by molding tungsten powder and sintering it, a smaller particle size enables the production of an anode body having a larger capacitance, if the volume of the anode body is the same. Therefore the smaller size of the material tungsten powder is more preferable, but the average particle size of a commercially-available tungsten powder is about 0.5 to 20 μm.

Tungsten powder can be manufactured by treating oxide, halide or ammonium salt of tungsten as a raw material with a reducing agent such as hydrogen. However, increase in the rate of reduction may give rise to a problem of generating a composite oxide and the like. Therefore, it is necessary to decrease the rate of reduction in order to produce finer powder, and it leads to low production efficiency and high cost. Also, it is necessary to produce the fine powder by a complicated process equipped with an expensive controlling device. Furthermore, there has been a problem of handling a material having a wide explosibility range such as hydrogen gas.

PRIOR ART

Patent Document

Patent Document 1: JP-A-2004-349658
Patent Document 2: JP-A-2003-272959
Patent Document 3: WO 2004/055843 (U.S. Pat. No. 7,154,743 B2)
Patent Document 4: WO 2012/086272

DISCLOSURE OF THE INVENTION

Problems to be Solved by the Invention

An object of the present invention is to solve the above-mentioned problems in the conventional technology, and to provide a method for processing of a tungsten powder to obtain a high yield of a tungsten powder having a smaller particle size and a larger BET specific surface area which serves as a material of a capacitor comprising tungsten as an anode body (hereinafter referred to as a tungsten capacitor); and a method for producing ultrafine tungsten powder using the above method.

Means to Solve the Problem

As a result of intensive study to solve the above-mentioned problem, the present inventors have found that a ultrafine tungsten powder which is more suitable for a tungsten capacitor can be obtained by classifying the currently-available tungsten powder into a fine powder having a relatively small average particle diameter and a coarse powder having a relatively large average particle diameter; forming an oxide film on the particle surface of the coarse powder obtained by the classification; and removing the oxide film formed in an oxidation process and a natural oxide film formed on the fine powder obtained by the classification process with an alkali aqueous solution. Thus, the present invention was accomplished.

That is, the present invention relates to a method for producing ultrafine tungsten powder and a method for finely powdering tungsten powder.

[1] A method for finely powdering tungsten powder, comprising:
   a classification process for classifying a material tungsten powder into a fine powder having a relatively small average particle diameter and a coarse powder having a relatively large average particle diameter;
   an oxidation process for forming an oxide film on the particle surface of the coarse powder obtained by the classification; and
   an alkali treatment process for removing the oxide film formed in the oxidation process and a natural oxide film formed on the fine powder with an alkali aqueous solution.

[2] A method for finely powdering tungsten powder, comprising:
   a classification process, repeating once or more of a step of classifying a material tungsten powder into a fine powder having a relatively small average particle diameter and a coarse powder having a relatively large average particle diameter;
   an oxidation process for forming an oxide film on the particle surface of the coarse powder having a relatively large average particle diameter; and
   an alkali treatment process for removing the oxide film formed in the oxidation process and a natural oxide film formed on the fine powder, which is obtained in the above multiple steps of classification, with an alkali aqueous solution.

[3] A method for finely powdering tungsten powder, wherein a process of finely powdering the ultrafine tungsten powder obtained by the method of finely powdering tungsten powder described in [1] or [2] above is conducted once or more according to the method for finely powdering tungsten powder described in [1] or [2] above.

[4] The method for finely powdering tungsten powder as described in any one of [1] to [3] above, wherein the classification process is performed by elutriation.

[5] The method for finely powdering tungsten powder as described in any one of [1] to [4] above, wherein the oxidation is the treatment of conducting electrolytic oxidation of a tungsten powder in an electrolyte solution while stirring.

[6] The method for finely powdering tungsten powder as described in [5] above, wherein the electrolytic solution is an aqueous solution of persulfuric acid or mineral acid.

[7] The method for finely powdering tungsten powder as described in [6] above, wherein the mineral acid is selected from phosphoric acid, nitric acid, hydrochloric acid, boric acid and sulfuric acid.

[8] The method for finely powdering tungsten powder as described in [6] above, wherein the mineral acid is phosphoric acid or boric acid.

[9] The method for finely powdering tungsten powder as described in any one of [1] to [5] above, wherein the oxidation process is a process of oxidizing a tungsten powder by dispersing the tungsten powder in an aqueous solution containing an oxidizing agent.

[10] The method for finely powdering tungsten powder as described in [9] above, wherein the oxidizing agent is selected from manganese(VII) compounds, chrome(VI) compounds, halogen acid compounds, peroxoacid compounds and salts thereof, peroxides, and persulfuric acid compounds.

[11] The method for finely powdering tungsten powder as described in [10] above, wherein the oxidizing agent is selected from hydrogen peroxide, potassium persulfate and ammonium persulfate.

[12] The method for finely powdering tungsten powder as described in any one of [1] to [11] above, wherein the alkaline aqueous solution is an aqueous solution of sodium hydroxide or an aqueous solution of potassium hydroxide.

[13] A method for producing ultrafine tungsten powder, comprising obtaining tungsten powder having an average particle diameter of 0.04 to 0.5 µm by a process including the method described in any one of [1] to [12] above.

[14] A method for producing ultrafine tungsten powder, comprising obtaining tungsten powder having a BET specific surface area of 3 to 15 $m^2/g$ by a process including the method described in any one of [1] to [12] above.

[15] A method for producing ultrafine tungsten powder, comprising obtaining tungsten powder having an average particle diameter of 0.04 to 0.4 µm and a BET specific surface area of 5 to 15 $m^2/g$ by a process including the method described in any one of [1] to [12] above.

Effects of the Invention

According to the present invention, using a currently available tungsten powder or a tungsten powder which can be produced by a known method as a raw material, an ultrafine tungsten powder having a smaller particle size and a larger BET specific surface area which is useful for use in an electrolytic capacitor can be produced at a high yield.

Since the ultrafine tungsten powder obtained by the present invention have a smaller particle size and a large BET specific surface area, the capacitance of the capacitor produced thereof is increased.

In the case of obtaining an ultrafine tungsten powder by oxidizing a material tungsten powder without being classified to thereby make part of the powder into tungsten oxide and by removing the tungsten oxide portion by the alkali treatment, the coarse powder in the material tungsten powder, which originally had a large average particle diameter, is to have a smaller particle diameter by finely powdering the material tungsten powder and becomes an ultrafine tungsten powder suitable for an electrolytic capacitor. On the other hand, most of the fine powder, which originally had a small average particle diameter, becomes tungsten oxide by the oxidation treatment and most of the tungsten oxide dissipates by the alkali treatment. For example, when making the spherical powder having a particle diameter of 0.5 µm into an ultrafine powder having a particle diameter of 0.3 µm without classification, and assuming that tungsten within the depth of 0.1 µm from the surface dissipates by the oxidation treatment, the fine powder having a particle diameter of 0.2 µm or less existing in the raw material powder at that time will become tungsten oxide as a whole and completely dissipates by the alkali treatment. Also, with respect to the spherical powder having a particle diameter of 0.5 µm, the calculated rate of mass decrease is 78 mass %. The actual powder is not perfectly spherical and the mass decrease rate varies depending on the size of the particle diameter. Therefore, the actual mass decrease rate is not that high, but unnecessary mass decrease can be prevented by taking out fine powder having a small average particle diameter, which is not to be subjected to the oxidation treatment, from the material tungsten powder by the classification process. To produce an ultrafine tungsten powder by such a method at a high yield gives a cost advantage.

BRIEF DESCRIPTION OF DRAWINGS

FIG. 1 shows a method for producing an ultrafine tungsten powder in a first embodiment of the present invention.

FIG. 2 shows a method for producing an ultrafine tungsten powder in a second embodiment of the present invention.

FIG. 3 shows methods (A) and (B) for producing an ultrafine tungsten powder in a third embodiment of the present invention.

MODE FOR CARRYING OUT THE INVENTION

[Material Tungsten Powder]

The average particle diameter of the material tungsten powder to be finely powdered in the present invention is preferably within the range of 0.1 to 10 μm. Note that in the present invention, the average particle diameter means a particle diameter value ($D_{50}$; μm) corresponding to cumulative volume % of 50 volume %.

A material tungsten powder can be obtained by, in addition to using a commercially-available product, manufacturing by a known method. For example, it can be obtained by manufacturing by appropriately selecting from a method of crushing tungsten trioxide powder under hydrogen atmosphere; a method of reducing tungsten acid or tungsten halide with hydrogen or sodium and the like. Also, a tungsten powder may be obtained reducing the tungsten-containing mineral directly or through several steps and by selecting reducing conditions.

However, since it is difficult to obtain a material tungsten powder having a small particle size by these methods, a fine particle tungsten powder subjected to the oxidation treatment and alkali treatment as the pretreatment as described later may be used as a material tungsten powder, or a tungsten powder obtained according to the method of the present invention may be used as a material tungsten powder. By using these tungsten powders subjected to the ultrafine powdering treatment, a tungsten powder having an even smaller particle size can be obtained. Thus, a tungsten powder having an average particle diameter of, for example, 0.04 μm or less can be obtained by repeating the process of applying the method of the present invention.

However, in the case of forming a dielectric layer by anode oxidation, there is a lower limit of the particle size of the powder which can be suitably used for a capacitor. The lower limit of the particle size of the tungsten powder used for a capacitor is twice or more the thickness of the dielectric layer to be formed. For example, when the rated voltage is 1.6 V, the particle size is to be 0.04 μm or more. If the particle size is smaller than the value as defined above, a conductive portion of the tungsten is not left sufficiently when performing anodic oxidation and it becomes difficult to construct an anode of an electrolytic capacitor.

Specifically, when used for a high capacitance capacitor having a low rated voltage, the particle size of the tungsten powder is preferably 0.04 to 0.4 μm, more preferably 0.08 to 0.2 μm.

The material tungsten powder used in the method of the present invention may contain impurities within a range which does not affect the capacitor properties or may be processed to contain elements such as silicon, nitrogen, carbon, boron, phosphorus and oxygen in order to improve the capacitor properties. However, it is preferable that the particle surface treatment such as silicidation, nitridation, carbonization or boronization to be described later is conducted in a process later than applying the present invention.

[Classification of the Material Tungsten Powder]

In the present invention, first, the material tungsten powder is classified into a fine powder having a relatively small particle diameter and a coarse powder having a relatively large particle diameter.

Examples of the classification method include a dry-method classification, a wet-method classification and sieve classification. Preferred is the sedimentation classification as being a kind of a wet-method classification. Specifically, examples of the method include the elutriation classification as being a kind of the sedimentation classification.

In the elutriation classification, a liquid medium is added to the material tungsten powder. At this time, the material tungsten powder exists in the liquid medium in an aggregated state, and therefore the powder is dispersed by being stirred with a homogenizer and the like to put the powder into a state near to that of the primary particles. When the liquid medium is allowed to stand for a predetermined time after stirring, particles having a relatively small particle diameter in the material tungsten powder float while particles having a relatively large particle diameter settle out. The particles in the floating zone are categorized as a fine powder while the other particles in the settling zone are categorized as a coarse powder. When the fine powder and the coarse powder are collected, they may be separated in a state in which the powders contain the liquid medium surrounding the floating zone and the settling zone.

The amount of the fine powder obtained by the classification can be artificially adjusted by controlling the standing time period after stirring and the amount of the liquid medium surrounding the floating zone to be absorbed when the fine powder is collected.

As a liquid medium, for example, water, ethanol and a mixture of water and ethanol are preferred because they enable good dispersion of the material tungsten powder and can be easily removed from the particles.

The amount of the liquid medium to the tungsten powder, stirring rate of the homogenizer, stirring time and standing time are determined by a preliminary experiment in consideration of the average particle diameter and particle diameter distribution of the material tungsten powder, amount of the fine powder, and the average particle diameter of the fine powder. The amount of the liquid medium should be larger than the amount necessary to soak the material tungsten powder.

The ratio of the fine powder to the material tungsten powder is generally 3 mass % or more and less than 30 mass %, preferably 5 mass % or more and less than 20 mass %. When the ratio exceeds 30 mass % or more, the average particle diameter of the fine powder as a final product will not be small enough and multiple classification operations are required, and therefore using the tungsten powder containing less than 30 mass % of the fine powder gives a cost advantage. When the ratio is less than 3 mass %, it leads to the rise in the mass decrease ratio at the time of producing a fine powder as a final product, and therefore it is desirable to use the tungsten powder containing 3 mass % or more of the fine powder.

[The Oxidation of the Surface of the Coarse Powder]

After the classification of the material tungsten powder, the coarse powder obtained by the classification is subjected to the oxidation treatment. The oxidation treatment can be conducted by electrolytic oxidation, chemical oxidation, or both of them.

(1) Electrolytic Oxidation

As an electrolyte, the water-soluble one such as mineral acid and salt thereof, and organic acid and salt thereof is of benefit, and aqueous solution of mineral acid is preferable because washing after oxidization is easy. Examples of mineral acid include phosphoric acid, nitric acid, hydrochloric acid, sulfuric acid and boric acid, and phosphoric acid or boric acid are preferable from the viewpoint that an oxide film having defects is obtained relatively easily, and the oxide film is easy to be removed with alkali aqueous solution later. Preferable concentration of the mineral acid aqueous solution is 0.1 to 5 mass %. If the concentration increases, cleaning of tungsten powder in the subsequent step becomes complicated.

The electrolytic oxidization is, for example, conducted as below. A material tungsten powder is put in a metal container containing an electrolyte while stirring, a predetermined voltage is applied between a metal stirring stick as an anode and the container as a cathode, and the tungsten powder is oxidized by applying a current at a temperature preferably from room temperature to the boiling point of the aqueous solution, more preferably 30° C. to 80° C. for preferably 10 minutes to 100 hours and more preferably 1 to 10 hours. A solvent component is supplied in the amount corresponding to the amount lost by evaporation, as needed.

The applied voltage may be set depending on the desired degree of fine powdering. Higher applied voltage leads to an increased amount of oxide film which results in smaller particle size. Specific voltage can be determined by a preliminary experiment. However, it takes time for electrolytic oxidization under high voltage, and preferable applied voltage may be set at 100V or less, and more preferably 50V or less.

After the electrolytic oxidization is finished, the operation of removing the liquid by decantation and the like is repeated, and the tungsten powder is washed with a solvent such as water. The color of the tungsten in this state changes from black to yellowish blue.

(2) Chemical Oxidation

A material tungsten powder is dispersed in an aqueous solution of oxidizing agent by stirring and the like and retained for a predetermined time to oxidize the surface of the powder. A device such as a homogenizer which is capable of vigorous stirring is preferably used in order to keep a good dispersion state and make the surface of the tungsten powder oxidized rapidly. Further, oxidization proceeds at a faster pace at a high temperature.

Examples of the oxidizing agent include a manganese (VII) compound such as permanganate; a chrome (VI) compound such as chromium trioxide, chromate and dichromate; a halogen acid compound such as perchloric acid, chlorous acid, hypochlorous acid and salt thereof; peroxide such as hydrogen peroxide, diethyl peroxide, sodium peroxide, lithium peroxide and peracetic acid; peroxoacid such as persulfate and salt thereof. Particularly preferred are hydrogen peroxide, potassium persulfate and ammonium persulfate, due to its handleability, stability as an oxidizing agent and high solubility to water.

Concentration of the oxidizing agent in an aqueous solution is within a range of about 1 mass % to a saturated solubility of the oxidizing agent. Concentration of the oxidizing agent can be appropriately determined by a preliminary experiment.

The time period for oxidization is one hour to 1,000 hours and preferably one hour to 100 hours. Oxidization temperature is from room temperature to the boiling point of the solvent and preferably 50° C. to the boiling point of the solution.

After oxidization reaction, tungsten powder is taken out from the oxidization reaction solution by decantation and the like, and a series of operations of feeding the tungsten powder into a solvent, stirring the resultant solution, allowing it to stand and subjecting it to decantation is repeated for washing the tungsten powder. The color of the tungsten at this point changes from black of the raw material to yellowish blue, and it can be visually confirmed that the surface of the tungsten powder is oxidized.

Regarding a solvent used in each step of the present invention, not only water but also a mixed aqueous solution of water and water-soluble organic solvent (e.g. ethanol and methanol) can be selected from the viewpoint of dispersibility of the powder and time required for decantation.

[Removal of Oxide Film]

When the fine powder obtained by the classification is brought into contact with a liquid medium for a long period of time and subjected to the treatment with a homogenizer, the surface of the powder turns pale blue by light natural-oxidation of the surface in some cases. The natural oxide film requires a removal process as with the oxide film formed on the coarse powder. However, since the film formed by the natural oxidation is very thin compared to the thickness of the oxide formed by the oxidizing agent and electrolytic oxidation, the mass decrease and decrease in the yield due to the removal of the oxide film are expected to be small.

The fine powder having a natural oxide film formed thereon and the coarse powder subjected to the oxidation treatment are subjected to the treatment with an alkaline aqueous solution to remove the formed oxide film at least chemically. Preferably, the alkali treatment is conducted using a device such as a homogenizer which is capable of vigorous stirring to improve the dispersibility of the fine powder and the coarse powder.

The alkali treatment can be conducted for the mixture of the fine powder and the coarse powder, or separately for the fine powder and the coarse powder. In a case where the tungsten powder is produced in several batches and multiple groups of a fine powder and a coarse powder exist, one or more of the fine powder groups may be mixed into one or more of the coarse powder groups. In this case, fine powder groups and coarse powder groups in a different batch may be mixed.

As an alkaline solution, for example, sodium hydroxide aqueous solution, potassium hydroxide aqueous solution, ammonia water and the like can be used, and sodium hydroxide aqueous solution and potassium hydroxide aqueous solution are preferable.

Specifically, an alkaline aqueous solution is added to a tungsten powder in which the surface is oxidized. The solution is allowed to stand after stirring. After removing the liquid by decantation, a series of operations of feeding a solvent such as water into the tungsten powder, stirring the resultant solution, allowing it to stand and subjecting it to decantation is repeated several times. By these operations, the color of the tungsten powder becomes black, and the oxide formed in the surface of tungsten particles is removed. Subsequently, the solution is dried in a vacuum dryer under reduced pressure (e.g. with the reduced pressure of $10^4$ to $10^2$ Pa at the temperature of 50 to 180° C.) and cooled to room temperature. Then, by gradually introducing air into the dryer so that ignition may not occur and taking out the powder into the air, an ultrafine tungsten powder having a smaller particle size than that of the material tungsten powder can be obtained.

As an example, when the method of Comparative Example 1 without conducting the classification to be described later is employed, the mass decrease rate of the material tungsten powder having an average particle diameter of 0.55 μm exceeds 25 mass %. In contrast, when the method of the present invention is employed, it is possible to produce a tungsten powder having an average particle diameter of 0.1 to 0.45 μm in one treatment at a mass decrease ratio of 5 to 20 mass %.

First Embodiment

As in FIG. 1, in a first embodiment of the present invention, an ultrafine tungsten powder is obtained by classifying the material tungsten powder into a fine powder having a relatively small average particle diameter and a coarse powder having a relatively large average particle diameter; forming an oxide film on the particle surface of the coarse powder obtained by the classification; and removing the above-mentioned oxide film and a natural oxide film formed on the fine powder obtained by the classification process with an alkali aqueous solution.

Second Embodiment

As in FIG. 2, a second embodiment of the present invention includes the following embodiment: after classifying the material tungsten powder into a fine powder having a relatively small average particle diameter and a coarse powder having a relatively large average particle diameter, the process of further classifying the coarse powder into a fine powder having a relatively small average particle diameter and a coarse powder having a relatively large average particle diameter is repeated once or more, forming an oxide film on the particle surface of the coarse powder obtained in the last classification, and the above-mentioned oxide film and a natural oxide film formed on the fine powder obtained by the multiple classification processes with an alkali aqueous solution to thereby obtain an ultrafine tungsten powder.

Third Embodiment

As in FIG. 3, a third embodiment of the present invention includes the following embodiment: the classification, oxidation of the coarse powder, and alkali treatment of the oxide film are conducted once or more for the ultrafine tungsten powder obtained by the method of the present invention in which the classification process, oxidation treatment of the coarse powder, and alkali treatment of the oxide film formed by the oxidation treatment and the natural oxide film on the fine powder are conducted in this order. (A) is an embodiment in which the classification, oxidation of the coarse powder, and alkali treatment of the oxide film are conducted once or more for the fine tungsten powder obtained by the embodiment of FIG. 1, while (B) is an embodiment in which the classification, oxidation of the coarse powder, and alkali treatment of the oxide film are conducted once or more for the fine tungsten powder obtained by the embodiment of FIG. 2.

The ultrafine tungsten powder produced by the method of the present invention may be directly sintered to be made into a sintered body, or may be granulated into granules about the size of 10 to 300 μm to be sintered and made into a sintered body. The granulated tungsten powder is easier to handle and to keep the ESR as low as possible.

Furthermore, the tungsten powder produced by the method of the present invention may be subjected to silicidation, nitridation, carbonization or boronization treatment to be made into a tungsten powder containing at least one of tungsten silicide, tungsten nitride, tungsten carbide and tungsten boride in a part of the surface of the tungsten particles. These treatments may be conducted when the tungsten powder has become a granulated powder or a sintered body.

An electrolytic capacitor is fabricated comprising such a sintered body as one electrode (anode), a counter electrode (cathode) and a dielectric body interposed therebetween.

EXAMPLES

The present invention is described below by referring to Examples and Comparative Examples, but the present invention is not limited thereto.

In the present invention, the particle diameter, specific surface area and tapping density of the tungsten powder were measured by the methods described below.

The particle diameter: The particle diameter was measured by using HRA9320-X100 manufactured by Microtrac Inc. and the particle size distribution was measured by the laser diffraction scattering method. A particle diameter value ($D_{50}$; μm) corresponding to cumulative volume % of 50 volume % was designated as the average particle diameter (d).

Specific surface area ($m^2/g$): The specific surface area was measured by the BET method by using Macsorb HM model-1208 (manufactured by Mountech Co., Ltd.).

Tapping density: 200 g of the sample powder was put in a 100 ml-volume measuring cylinder and the volume was measured after dropping the powder from a height of 10 mm 100 times.

Example 1

500 g of material tungsten powder having an average particle diameter of 0.55 μm and particle diameter distribution of 0.05 to 20 μm (BET specific surface area: 3.0 $m^2/g$) was prepared by reducing a tungsten trioxide powder with hydrogen. The powder was put in a container (diameter: 110 mm, height: 250 mm) with 600 g of water, and stirred at 1,800 rotations/minute at 25° C. for 17 hours using homogenizer NS-51 manufactured by MICROTEC Co., Ltd. After allowing the liquid to stand for two minutes, the classification process was conducted by drawing 150 ml of the liquid in the floating zone into a syringe to be separated as a fine powder.

The reclassification process of separating a fine powder was conducted in a similar manner for the coarse powder obtained by the classification process. The fine powders obtained by the classification process and the reclassification process were mixed, and after being dried at 125° C., the mixture was pulverized in an agate mortar and the resultant powder had a mass of 94 g and BET specific surface area of 5.7 $m^2/g$.

Next, 400 ml of water and 80 g of ammonium persulfate were added to the coarse powder obtained by the reclassification process. The treatment with a homogenizer was again conducted for 10 hours and the oxidation treatment of the tungsten surface was conducted. After allowing the liquid to stand for 24 hours, the supernatant was removed, 2,000 ml of water was further added thereto, and the resultant was stirred for 30 minutes. The operation of adding water, stirring, allowing the liquid to stand and removing the supernatant was conducted five times in total. The supernatant in the last operation had a pH of 3.

Subsequently, the mixture of the fine powders obtained by the classification process and the reclassification process and the coarse powder subjected to the oxidation treatment were mixed, 700 ml of 1N aqueous sodium hydroxide solution was added thereto, and the resultant was stirred for 31 hours. After 24 hours, the supernatant was removed, 2,000 ml of water was added to the solution, and the resultant was stirred for 30 minutes and allowed to stand. The operation of adding water, stirring, allowing the liquid to stand and removing the supernatant was conducted seven times in total. The supernatant in the last operation had a pH of 7. After the final product of the treatment was vacuum-dried at 125° C., the product was taken out and pulverized with an agate mortar. The produced ultrafine tungsten powder had a mass of 455 g, an average particle diameter of 0.21 μm, particle diameter distribution of 0.05 to 20 μm, tapping density of 3.3 g/cm$^3$, BET specific surface area of 6.4 m$^2$/g, and oxygen content of 6,500 ppm by mass.

Comparative Example 1

An ultrafine tungsten powder was produced in the same way as in Example 1 except that the classification process of the material tungsten powder was not conducted. The obtained ultrafine tungsten powder had a mass of 370 g, an average particle diameter of 0.39 μm and BET specific surface area of 4.4 m$^2$/g.

The results of Example 1 and Comparative Example 1 are shown in Table 1.

TABLE 1

| | Fine powder obtained by classification | | | Finally-obtained tungsten ultrafine powder | | |
|---|---|---|---|---|---|---|
| | Standing time (min) | Mass (g) | BET value (m$^2$/g) | Obtained amount (g) | Average particle diameter (μm) | BET value (m$^2$/g) | Yield (%) |
| Example 1 | 2 | 94 | 5.5 | 455 | 0.21 | 6.4 | 91 |
| Comparative Example 1 | No operation | No operation | No operation | 370 | 0.39 | 4.4 | 74 |

As can be seen from Table 1, it is possible to obtain an ultrafine tungsten powder having a smaller average particle diameter and a larger BET specific surface area at a high yield in Example 1 in which a classification process was conducted compared to the powder of Comparative Example 1 without conducting a classification process.

Examples 2 to 4

An ultrafine tungsten powder was produced in the same way as in Example 1 except that the standing time in the classification process was changed to 20 seconds (Example 2), 25 minutes (Example 3) or two hours (Example 4). The amount (g) and BET specific surface area (m$^2$/g) of the fine powder obtained by the classification, the amount (g), an average particle diameter (μm), BET specific surface area (m$^2$/g) and yield of the finally obtained ultrafine powder are shown in Table 2.

TABLE 2

| | Fine powder obtained by classification | | | Finally-obtained tungsten ultrafine powder | | |
|---|---|---|---|---|---|---|
| | Standing time (min) | Mass (g) | BET value (m$^2$/g) | Obtained amount (g) | Average particle diameter (μm) | BET value (m$^2$/g) | Yield (%) |
| Example 1 | 2 | 94 | 5.5 | 455 | 0.21 | 6.4 | 91 |
| Example 2 | 0.67 | 147 | 4.4 | 472 | 0.44 | 3.8 | 94.4 |
| Example 3 | 25 | 28 | 9.3 | 420 | 0.19 | 6.8 | 84 |
| Example 4 | 120 | 16 | 10.3 | 402 | 0.24 | 5.9 | 80.4 |

Examples 2 to 4 make the following matter clear with respect to the yield, average particle diameter and BET specific surface area of the ultrafine tungsten powders obtained by allowing the liquid to stand for a different amount of time in the classification process.

As the standing time becomes shorter, the ratio of the ultrafine powder obtained by the classification increases, thereby increasing the yield of the fine powder. Since the appropriate standing time differs depending on the material tungsten powder, it needs examination by a preliminary experiment in order to obtain an ultrafine tungsten powder having a smaller average particle diameter and a larger BET value.

Example 5

A fine tungsten powder was obtained in the same way as in Example 1 except that a mixed solvent of 500 g of water and 100 g of ethanol was used instead of 600 g of water as a liquid to be added first to the material tungsten powder.

The total mass of the fine powder was 106 g and the BET specific surface area was 5.5 m$^2$/g. Next, an ultrafine powder was obtained in the same way as in Example 1 except that the kind of the oxidation agent at the time of conducting the surface oxidation was changed from ammonium persulfate to potassium persulfate, and two platinum electrodes were provided apart from each other in the solution in the container and a voltage of 15V was applied between the electrodes (a gauze sack was put over the electrode as a cathode in order to allow the contact with the solution only and to prevent the contact with the powder). The produced ultrafine tungsten powder had a mass of 418 g, an average particle diameter of 0.12 μm, particle diameter distribution of 0.03 to 19 μm, tapping density of 2.7 g/cm$^3$, BET specific surface area of 10.2 m$^2$/g and oxygen content of 8,700 ppm by mass.

Comparative Example 2

An ultrafine tungsten powder was produced in the same way as in Example 5 except that the classification of the material tungsten powder was not conducted. The obtained ultrafine tungsten powder had a mass of 305 g, an average particle diameter of 0.16 μm and BET specific surface area of 8 m$^2$/g.

The results of Example 5 and Comparative Example 2 are shown in Table 3.

TABLE 3

|  | Fine powder obtained by classification | | | Finally-obtained tungsten ultrafine powder | | | |
| --- | --- | --- | --- | --- | --- | --- | --- |
|  | Standing time (min) | Mass (g) | BET value (m$^2$/g) | Obtained amount (g) | Average particle diameter (μm) | BET value (m$^2$/g) | Yield (%) |
| Example 5 | 2 | 106 | 10.2 | 418 | 0.12 | 10.2 | 83.6 |
| Comparative Example 2 | No operation | No operation | No operation | 305 | 0.16 | 8 | 61 |

Table 3 reveals that, even if the solvent in the classification process is changed to a mixed solvent of water and alcohol, it is possible to obtain an ultrafine tungsten powder having a smaller average particle diameter and a larger BET specific surface area at a high yield in Example 5 in which a classification process was conducted compared to the powder of Comparative Example 2 without conducting a classification process.

When a mixed solvent of water and alcohol is employed as the solvent in the classification process, a fine powder is easier to float in the solvent compared to the case of using a single solvent of water. From the effect of floating, there is a small increase in the ratio of the fine powder obtained by the classification, and the yield of the ultrafine powder tends to decline. Since an appropriate solvent differs depending on the material tungsten powder, it needs to be studied by a preliminary experiment in order to obtain a ultrafine tungsten powder having a smaller average particle diameter and a larger BET value.

The invention claimed is:

1. A method for finely powdering tungsten powder, comprising:
   a classification process for classifying a material tungsten powder into a fine powder having a relatively small average particle diameter and a coarse powder having a relatively large average particle diameter;
   an oxidation process for forming an oxide film on the particle surface of the coarse powder having a relatively large average particle diameter; and
   an alkali treatment process for removing the oxide film formed in the oxidation process and a natural oxide film formed on the fine powder with an alkali aqueous solution.

2. A method for finely powdering tungsten powder, comprising:
   a classification process, repeating once or more of a step of classifying a material tungsten powder into a fine powder having a relatively small average particle diameter and a coarse powder having a relatively large average particle diameter;
   an oxidation process for forming an oxide film on the particle surface of the coarse powder obtained by the classification; and
   an alkali treatment process for removing the oxide film formed in the oxidation process and a natural oxide film formed on the fine powder, which is obtained in the above multiple steps of classification, with an alkali aqueous solution.

3. A method for finely powdering tungsten powder, wherein a process of finely powdering an ultrafine tungsten powder obtained by the method of finely powdering tungsten powder claimed in claim 1 is conducted once or more according to the method for finely powdering tungsten powder claimed in claim 1.

4. The method for finely powdering tungsten powder as claimed in claim 1, wherein the classification process is performed by elutriation.

5. The method for finely powdering tungsten powder as claimed in claim 1, wherein the oxidation is a treatment of conducting electrolytic oxidation of a tungsten powder in an electrolyte solution while stirring.

6. The method for finely powdering tungsten powder as claimed in claim 5, wherein the electrolytic solution is an aqueous solution of persulfuric acid or mineral acid.

7. The method for finely powdering tungsten powder as claimed in claim 6, wherein the mineral acid is selected from phosphoric acid, nitric acid, hydrochloric acid, boric acid and sulfuric acid.

8. The method for finely powdering tungsten powder as claimed in claim 6, wherein the mineral acid is phosphoric acid or boric acid.

9. The method for finely powdering tungsten powder as claimed in claim 1, wherein the oxidation process is a process of oxidizing a tungsten powder by dispersing the tungsten powder in an aqueous solution containing an oxidizing agent.

10. The method for finely powdering tungsten powder as claimed in claim 9, wherein the oxidizing agent is selected from manganese(VII) compounds, chrome(VI) compounds, halogen acid compounds, peroxoacid compounds and salts thereof, peroxides, and persulfuric acid compounds.

11. The method for finely powdering tungsten powder as claimed in claim 10, wherein the oxidizing agent is selected from hydrogen peroxide, potassium persulfate and ammonium persulfate.

12. The method for finely powdering tungsten powder as claimed in claim 1, wherein the alkaline aqueous solution is an aqueous solution of sodium hydroxide or an aqueous solution of potassium hydroxide.

13. A method for producing ultrafine tungsten powder, comprising obtaining tungsten powder having an average particle diameter of 0.04 to 0.5 μm by a process including the method claimed in claim 1.

14. A method for producing ultrafine tungsten powder, comprising obtaining tungsten powder having a BET specific surface area of 3 to 15 m$^2$/g by a process including the method claimed in claim 1.

15. A method for producing ultrafine tungsten powder, comprising obtaining tungsten powder having an average particle diameter of 0.04 to 0.4 μm and a BET specific surface area of 5 to 15 m²/g by a process including the method claimed in claim 1.

\* \* \* \* \*